(12) United States Patent
Bouillet et al.

(10) Patent No.: US 9,267,789 B2
(45) Date of Patent: Feb. 23, 2016

(54) METHOD FOR THE ABSOLUTE MEASUREMENT OF THE FLATNESS OF THE SURFACES OF OPTICAL ELEMENTS, USING AN INTERFEROMETER AND A THREE-FLAT METHOD

(75) Inventors: Stephane Bouillet, Liposthey (FR); Chloe Morin, Pessac (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 24 days.

(21) Appl. No.: 14/236,487

(22) PCT Filed: Aug. 3, 2012

(86) PCT No.: PCT/EP2012/065275
§ 371 (c)(1),
(2), (4) Date: Jan. 31, 2014

(87) PCT Pub. No.: WO2013/020925
PCT Pub. Date: Feb. 14, 2013

(65) Prior Publication Data
US 2014/0160491 A1 Jun. 12, 2014

(30) Foreign Application Priority Data
Aug. 5, 2011 (FR) ..................... 11 57207

(51) Int. Cl.
*G01B 11/02* (2006.01)
*G01B 11/24* (2006.01)
*G01B 11/30* (2006.01)
*G01B 9/02* (2006.01)

(52) U.S. Cl.
CPC ........ *G01B 11/2441* (2013.01); *G01B 9/02018* (2013.01); *G01B 9/02057* (2013.01); *G01B 9/02087* (2013.01); *G01B 11/306* (2013.01); *G01B 2290/25* (2013.01)

(58) Field of Classification Search
CPC ............. G01B 11/2441; G01B 11/303; G01B 11/306; G01B 2290/25; G01B 9/02018; G01B 9/02057; G01B 9/02087; G01B 11/30; G01B 11/02
See application file for complete search history.

(56) References Cited

U.S. PATENT DOCUMENTS 5,502,566 A * 3/1996 Ai et al. .................. 356/514
6,018,990 A 2/2000 Ueki
(Continued)

OTHER PUBLICATIONS

Preliminary French Search Report issued Feb. 24, 2012, in French Patent Application No. 1157207 with English translation of category of cited documents.
(Continued)

*Primary Examiner* — Michael P Lapage
(74) *Attorney, Agent, or Firm* — Oblon, McClelland, Maier & Neustadt, L.L.P.

(57) ABSTRACT

A method for absolute measurement of flatness of surfaces of optical elements. In the method, an interferometer having a measurement axis is used for applying a three-flat method to three optical elements, by conducting actual measurements on the elements, surfaces of the elements are reconstructed by an iterative processing operation in which measurements are simulated and simulated measurements are compared with the actual measurements. At least two actual measurements are made after having performed a rotation around the measurement axis and/or a translation perpendicular to the measured axis, of a measured optical element relative to the other.

10 Claims, 2 Drawing Sheets

(56) References Cited

U.S. PATENT DOCUMENTS

| | | | |
|---|---|---|---|
| 6,184,994 B1* | 2/2001 | Freischlad | 356/511 |
| 2004/0190002 A1* | 9/2004 | Schulte et al. | 356/512 |
| 2006/0098209 A1* | 5/2006 | Smythe et al. | 356/512 |
| 2006/0285123 A1* | 12/2006 | Evans et al. | 356/511 |
| 2010/0177322 A1* | 7/2010 | Nakauchi | 356/512 |

OTHER PUBLICATIONS

G. Schulz, et al., "Interferometric testing of smooth surfaces", E. Wolf, Progress in Optics, vol. XIII, North-Holland, ch. IV, 1976, 2 front pages, pp. 95-167.

Chiayu Al, et al., "Absolute testing of flats by using even and odd functions", Applied Optics, vol. 32, No. 25, Sep. 1, 1993, pp. 4698-4705.

Freischlad, K. R., "Absolute Interferometric testing based on reconstruction of rotational shear", Applied Optics, vol. 40, No. 10, pp. 1637-1648, (Apr. 1, 2001) XP002669754.

Vannoni, M. et al., "Iterative algorithm for three flat test", Optics Express, vol. 15, No. 11, pp. 6809-6816, (May 18, 2007) XP002669755.

International Search Report Issued Oct. 31, 2012 in PCT/EP12/065275 Filed Aug. 3, 2012.

* cited by examiner

METHOD FOR THE ABSOLUTE MEASUREMENT OF THE FLATNESS OF THE SURFACES OF OPTICAL ELEMENTS, USING AN INTERFEROMETER AND A THREE-FLAT METHOD

TECHNICAL FIELD

The present invention relates to a method for absolute measurement of the flatness of surfaces of optical elements, preferably by means of an interferometer of the Fizeau type.

It notably applies to the absolute measurement of the flatness of optical components of large size, for example optical components with a diameter of 800 mm, intended to form reference components which are then used for checking the flatness of other optical components.

THE STATE OF THE PRIOR ART

With an interferometer of the Fizeau type, the measurement of optical surfaces by reflection are relative to a reference surface, or reference flat. However, the defects of the latter may not be negligible relatively to those of the optical surfaces which are measured.

Several absolute metrological methods are known, with which it is possible to do without the defects of the reference surface. In particular the three-flat method is known from the following document to which reference will be made:
[1] G. Schulz and J. Schwider, <<Interferometric testing of smooth surfaces>>, Progress in Optics, E. Wolf, ed. (North-Holland), Vol. XIII, ch. IV (1976).

The three-flat method is at the basis of a large number of absolute metrological methods. On this subject, reference will be made for example to the following documents:
[2] C. Ai et J. C. Wyant, <<Absolute testing of flats by using even and odd functions>>, Appl. Opt., Vol. 32, 4698-4705 (1993)
[3] K. R. Freischlad, "Absolute interferometric testing based on reconstruction of rotational shear", Appl. Opt., Vol. 40, 1637-1648 (2011).

The three-flat method is very schematically illustrated by FIG. 1. According to this method, three measurements M1, M2, M3 are conducted by means of a Fizeau interferometer 2 and of three optical components such as plates A, B, C for example. In the example illustrated by FIG. 1, the components A and C are partly reflective.

In the first measurement M1, two respective surfaces or flats of the components A and B are facing each other in the interferometer 2 in order to define an optical cavity 4. As this may be seen, in the second measurement M2, the component B is replaced with the component C; and in the third measurement, the component B remains in place but the component A is replaced with the component C.

The three measurements respectively provide interferograms which are processed in order to measure in an absolute way the facing surfaces.

However, in order to observe the same face of the component C between the second and the third measurement, it is seen that this component C has to be turned over according to a vertical axis Y (rotation of 180° around the axis Y).

Because of this turning over, only the even portion of the defects of the turned-over element is invariant between both of these measurements M2 and M3. Therefore it is only possible to determine in an absolute way the even portion of the defects of the component C relatively to the vertical axis Y. In other words, only the defects which are invariant by a rotation of 180° around the axis Y may be determined in an absolute way.

In other methods, measurements are added, which are made after having performed translations and/or rotations of one of the optical components. By means of algorithms using Fourier transforms for example, it is then possible to characterize the three (flats) in an absolute way. These methods are however often very complicated to apply.

Another method, which is very different from the previous ones (which are analytical), uses an iterative algorithm for reconstructing the three flats from a set of measurements. This other method is known from the following document to which reference will be made:
[4] M. Vannoni and G. Molesini, <<Iterative algorithm for three flat test>>, Opt. Express, Vol. 15, 6809-6816 (2007).

This other method uses three virtual optical components for which the (virtual) surfaces of interest are initially perfectly flat. The reconstruction of the defects is then carried out by iteration of three main steps:
a step for simulating the measurements in which the interferometry measurements are mathematically simulated from the virtual components,
a step for estimating the errors, wherein the simulated measurements are compared with actual measurements, carried out with the three (actual) optical reference components on the bench for optical measurements, including the Fizeau interferometer, and
a step for assigning errors wherein the errors are assigned to the three respective virtual surfaces of the three virtual components.

In fact, the method which is described in document [4] uses a set of four measurements, i.e. the measurements carried out with the three basic combinations, such as the A-B, A-C and C-B combinations of FIG. 1, as well as with a fourth measurement conducted after having performed a rotation of one of the measured components, around the measurement (horizontal) axis of the interferometer, noted as Z in FIG. 1.

With the set of the four measurements proposed in this document [4], the quality of the reconstruction of the reference components is insufficient. Further, the application of the method, i.e. the selection of the measurements to be conducted and the processing of these measurements, is not specified in document [4].

DISCUSSION OF THE INVENTION

The object of the present invention is to find a remedy to the previous drawbacks. It proposes a method for absolute measurement allowing better quality reconstruction than with the method known from document [4].

In order to accomplish this, the present invention does not use four measurements but at least five measurements, i.e. the measurements conducted with the three basic combinations and at least two additional measurements.

Specifically, the object of the present invention is a method for absolute measurement of the flatness of the surfaces of optical elements wherein:
an interferometer having a measurement axis and including a reference surface position and a test surface position is used for applying the three-flat method by means of three optical elements, by conducting actual measurements on the latter, the actual measurements respectively providing interferograms, and
the respective planes of the three optical elements are reconstructed with an iterative processing operation in which the actual measurements are mathematically simulated and the simulated measurements are compared with the actual measurements, and wherein each actual measurement is conducted by placing the respective planes of two of the three optical elements facing each other, respectively in the reference surface position (a surface at which light is partly transmitted) and in the test surface position (a surface used in reflection), characterized in that at least two of the actual measurements are conducted after having performed a rotation around the measurement axis and/or a translation perpendicularly to the latter, of one of the two optical elements relatively to the other.

According to a preferred embodiment of the method, object of the invention, the interferometer is an interferometer of the Fizeau type.

Preferably, at least one of the actual measurements is made after having performed a rotation around the measurement axis, and another actual measurement is made after having performed a translation perpendicularly to the measurement axis.

According to a preferred embodiment of the invention, at least two rotations are performed around the measurement axis, and the respective angles of both rotations differ from each other by more than 10°.

Preferably, each rotation is performed according to an angle which is not a sub-multiple of 360°.

According to the invention, it is further preferable to determine a translational shift in a plane perpendicular to the measurement axis and a rotational shift around the latter, shifts which may affect the optical elements between two actual measurements, with view of readjusting the latter relatively to each other.

It is further advantageously possible to determine the zoom shift in the plane perpendicular to the measurement axis, which may also affect the optical elements between two actual measurements.

According to a preferred embodiment of the invention, with view to determining the shifts, the interferograms of the two actual measurements are divided into several portions, the correlation products are calculated between the corresponding portions, the respective positions of the correlation peaks corresponding to the correlation products are determined and each shift is determined from the thereby determined respective positions.

Preferably, each interferogram is then divided into nine portions which form a 3×3 matrix.

Also preferably instead of directly using said portions, the gradients of these portions are determined and the correlation products are calculated between the corresponding gradients.

Further, the position of each correlation peak is preferably determined by a barycentric calculation.

BRIEF DESCRIPTION OF THE DRAWINGS

The present invention will be better understood upon reading the description of exemplary embodiments given hereafter, purely as an indication and by no means as a limitation, with reference to the appended drawings wherein.

DETAILED DESCRIPTION OF PARTICULAR EMBODIMENTS

Figure 2:
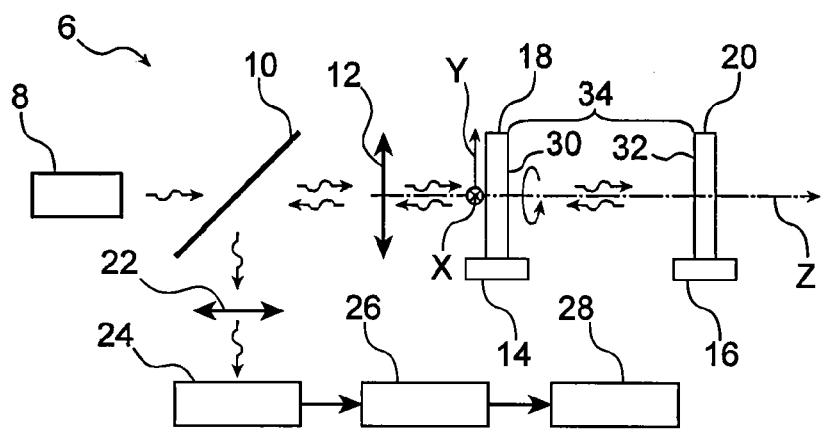

FIG. 2 is a very schematic view of a known interferometer 6, of the Fizeau type, which may be used for applying an example of the absolute measurement method, object of the invention.

As this is seen in FIG. 2, this interferometer 6 comprises:
a light source 8,
a semi-reflective mirror 10,
collimation optics 12,
two devices 14 and 16 provided for respectively holding the optical elements (for example plates), such as the elements 18 and 20, which are intended to be measured in absolute way,
focusing optics 22,
a CCD camera 24 allowing the formation of interferograms,
a computer 26 for processing these interferograms and
a device 28 for displaying the results obtained by means of the computer 26.

In fact, the respective surfaces 30 and 32 or flats, of the elements 18 and 20 are measured in absolute way. These vertical surfaces 30 and 32 define an optical cavity 34 and respectively occupy a reference surface position and a test surface position in the interferometer 6.

It is specified that the optical elements, intended to be held by the device 14 are partly reflective.

The horizontal measurement axis of the interferometer has reference Z in FIG. 2. Two other axes are also defined, i.e. a horizontal axis X and a vertical axis Y which form a cube corner with the axis Z. The surfaces 30 and 32 are parallel to the plane defined by the axes X and Y.

The device 14 is also provided for displacing the element 18 which it holds (and therefore the corresponding surface 30) in rotation around the axis Z and in translation parallel to the axis X and to the axis Y, and therefore perpendicularly to the axis Z.

In the relevant example of the absolute measurement method, object of the invention, the interferometer 6 is therefore used for applying the three-flat method by means of three optical elements, by conducting actual measurements on the latter, measurements which respectively provide interferograms.

Each actual measurement is conducted by placing the respective planes of two of the three optical elements facing each other, respectively in the reference surface position and in the test surface position.

Further, the respective planes of the three optical elements are reconstructed by an iterative processing operation in which the actual measurements are mathematically simulated and the simulated measurements are compared with the actual measurements, as taught by document [4].

As the goal is to have given high accuracy on the absolute mappings of the measured surfaces of the optical elements such as the elements 18 and 20 of FIG. 2, a certain number of simulations were carried out in order to optimize the reconstruction quality of the absolute mappings of these surfaces.

The behavior of the algorithm, known from document [4], was studied (by computer) for different experimental procedures, in the following way: definition of 3 virtual initial planes including defects—simulation of an experimental procedure (measurements corresponding to the three basic combinations and additional measurements)—obtaining a set of virtual interferograms—reconstruction by the method known from document [4]—obtaining three reconstructed planes—comparison of the latter with the 3 virtual initial planes in order to obtain 3 error maps.

To the measurements corresponding to the three basic combinations, were added measurements for which one of the optical elements undergoes rotations around the axis Z and/or translations perpendicularly to this axis.

The comparison between the initial virtual planes and the reconstructed planes is accomplished by simple subtraction (by subtracting, pixel by pixel, a reconstructed plane from the corresponding initial virtual plane). The error maps are thereby obtained, which allow an easy study of the reconstruction quality of the algorithm known from document [4].

Figure 1:
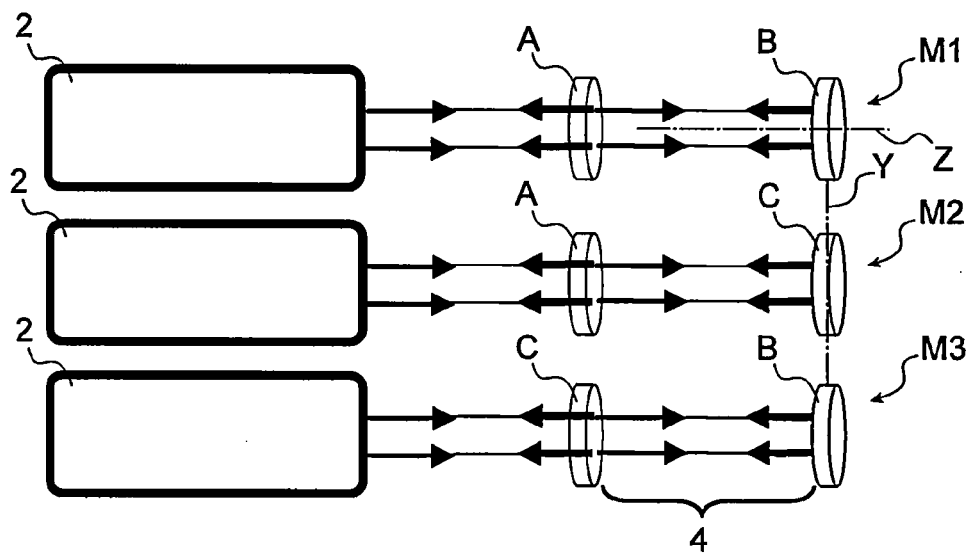
FIG. 1 schematically illustrates the three-flat method and has already been described, FIG. 2 schematically illustrates an interferometer of the Fizeau type which may be used in the present invention for conducting the measurements.

The simulations carried out thus led to adding at least two measurements to the ones which correspond to the three basic combinations (A-B, A-C, C-B in FIG. 1) for improving the reconstruction quality. In the example of FIG. 2, each additional measurement is made after having performed a rotation of the element 18 around the axis Z and/or a translation of this element perpendicularly to this axis.

It was found that it was preferable to perform one or several rotations around the axis Z and additionally a translation perpendicularly to this axis and even at least two rotations plus this translation. The latter makes it possible to improve the quality of the reconstruction of the center of the optical elements.

In order to reduce the symmetry effects on the error maps, it is also preferable that the angles of the rotations be well distinct from each other, i.e. differ by more than 10° from each other, and that none of the angles be a sub-multiple of 360°; as an example, each angle is selected so as to be different from values such as 30°, 60°, 90° and 180°.

For example, on the error maps, we were able to see that the addition of a rotation of 90° gave a residual error having a symmetry of 90°, whence the exclusion of such a value.

Coming back to the example of FIG. 2, with view to reducing the influence of the defects of the device 14 which allows the rotations of the optical element which it holds, it was decided to perform three rotations having angles of 37°, 110° and 168° respectively.

Figure 3:
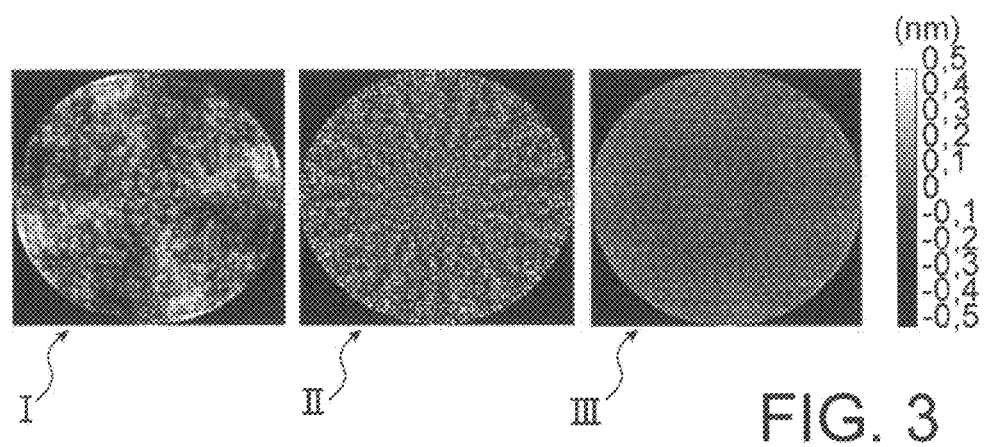
FIG. 3 shows three error maps which show the benefit of the invention.

As an example, FIG. 3 shows error maps which were obtained for various experimental procedures. The error map I corresponds to a rotation of 90° (around the axis Z), map II to three rotations of 37°, 110° and 168°, respectively and map III to three rotations of 37°, 110° and 168° respectively and a translation of 22 mm respectively (perpendicularly to the axis Z).

Figure 4:
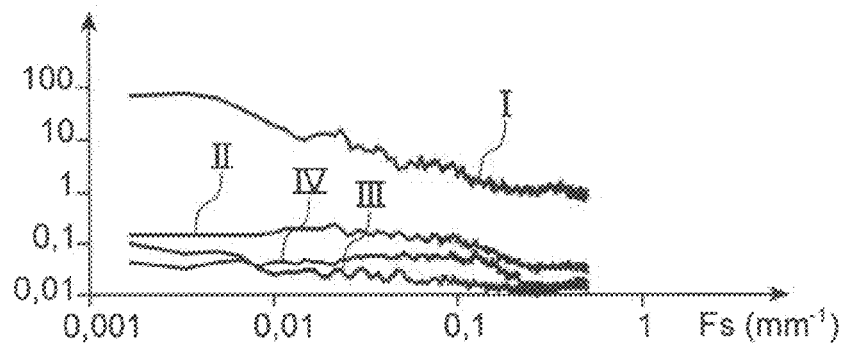
FIG. 4 shows the profiles of the power spectral densities of these error maps, and FIG. 5 schematically illustrates shifts of correlation peaks which may affect interferograms subdivided into several portions, during translational shifts, zoom shifts or rotational shifts of optical elements between two measurements.

In FIG. 4, profiles of the power spectral densities of these error maps were plotted. They make it possible to see the distribution of the spatial frequencies of the non-reconstructed defects. These spatial frequencies Fs are plotted in abscissas; and in ordinates, the units are arbitrary.

Profile I corresponds to the rotation of 90°, profile II to the three rotations of 37°, 110° and 168° and profile IV to these three rotations plus the translation of 22 mm. Profile III as for it corresponds to four rotations of 37°, 110°, 168° and 220°.

FIGS. 3 and 4 show that by adding a translation to the rotations, the reconstruction is improved and more improved than by adding a rotation, at the very least in a wide range of spatial frequencies (see FIG. 4).

By additional studies, it was noted that small shifts (in rotation or translation) of the optical elements between the measurements implied poor reconstruction of the high spatial frequencies in the reconstructed mappings.

In order to find a remedy to these shifts, mechanical reference marks were set into place on the optical elements, on the side of the surfaces to be measured. However, in spite of the setting into place of these mechanical reference marks at the optical elements, small shifts (of less than one pixel i.e. less than a value of the order of 1 mm) of the elements between the different measurements in which these elements intervene, add noise during reconstruction.

In order to optimize the latter, it was therefore sought to suppress these shifts or more specifically to determine them with view to readjusting a measurement relatively to another. Because of the conducted measurements, the shifts may be shifts in rotation and/or in translation.

The shift in translation of an optical element between two measurements may be evaluated by performing a correlation product between both of these measurements or more specifically, between the two corresponding interferograms. Indeed, the position of the obtained correlation peak gives us the possibility of determining the shift of the element along the axis X and along the axis Y. However, such a method does not allow determination of the shifts in rotation (around the axis Z).

It was therefore decided to cut out each measurement, or more exactly the result of the latter i.e. the interferogram which corresponds to it, into nine portions (reference P in FIG. 5) forming a 3×3 matrix. The nine correlation products are then calculated between the corresponding portions; the nine positions of the correlation peaks corresponding to these products are determined; and each shift is determined from these positions.

To do this, the arithmetic mean of the nine elementary shifts along X (respectively Y) corresponding to the nine portions, is calculated in order to obtain the total shift in translation along X (respectively Y).

As regards the shift in rotation, the tangential vectors are considered. Each of the latter passes through the center of one portion and is perpendicular to the corresponding radial vector. And each of the radial vectors passes through the center of the set of the nine portions and through the center of one portion.

The projection of each elementary shift on the corresponding tangential vector is then determined; and the weighted arithmetic mean (by the distance between the respective centers of the portions and the center of the set of these portions) of the thereby determined projections is calculated in order to obtain the shift in rotation.

Figure 5:
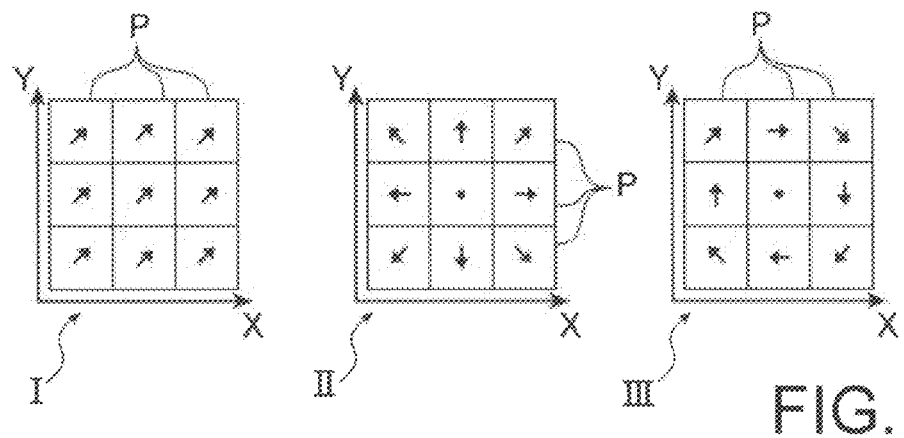

All of this is schematically illustrated by FIG. 5, the portion I of which is relative to the shift in translation and the portion III to the shift in rotation. The portion II is relative to a zoom shift which will be discussed subsequently.

In order to have better accuracy on the shift values, it is preferably to study the high frequencies of the images. The nine correlation products are then calculated between the gradients of the corresponding portions (instead of calculating them between the actual portions).

Next, the determination of the position of each of the correlation peaks is accomplished by a barycentric calculation in order to have sub-pixel accuracy on the value of the shift. And the determination of the shifts in translation and in rotation is again accomplished by a calculation of averages as this was seen above.

It is also possible to determine a zoom shift between two measurements. To do this, the projection of each elementary shift on the corresponding radial vector is determined; and the arithmetic mean of the thereby determined projections is calculated in order to obtain the zoom shift.

The evaluation of these shifts may be used when flat mirrors are checked for example by means of optical elements used as references, which were measured in accordance with the invention.

Such a check is accomplished by means of the interferometer 6; and a single subtractive measurement then gives the possibility of comparing a mirror with a reference element and of seeing whether the mirror is acceptable or not, according to predefined specifications.

In such an application, the shifts need to be evaluated. Indeed, in order to limit noise, it is necessary to readjust as accurately as possible the measurement on the reference map (interferogram of the element used as reference) to be used. To do this, the zoom shift also needs to be determined. From shifts on the nine portions, a projection along the radial vectors makes it possible to evaluate the zoom factor between a measurement and a reference mapping.

By knowing the shifts, it is possible to readjust one measurement relatively to the other. It is then possible to devise a readjustment program in which the obtained interferograms are processed (by a computer) in order to determine the shifts, and these interferograms are corrected in order to take into account the shifts, which makes it possible to readjust the measurements relatively to each other.

The present invention makes it possible to qualify optical elements of all qualities and of all sizes with view to using them as references for checking other optical elements. With the invention, it is thus possible to use optical reference elements of lower quality and therefore less costly, while allowing relatively rapid and accurate checking process.

Further, the readjustment program mentioned above is highly adapted to such an application since it provides a non-negligible gain on the quality of the absolute mappings.

In the examples of the invention given above, an interferometer of the Fizeau type is used. But the invention is not limited to this type of interferometer: a person skilled in the art may adapt the given examples to other interferometers for example to an interferometer of the Twyman-Green type or to an interferometer of the Mach-Zehnder type.

Also, the invention is not limited to subdividing the interferograms into nine portions, a person skilled in the art may adapt the given examples to the use of other subdivisions, for example subdivisions into $(2N+1)^2$ portions, forming $(2N+1)\times(2N+1)$ matrixes wherein N is an integer greater than 1.

The invention claimed is:

1. A method for absolute measurement of flatness of surfaces of optical elements, comprising:
    using an interferometer having a measurement axis and including a reference surface position and a test surface position for applying a three-flat method to three optical elements, by conducting actual measurements on the three optical elements, the actual measurements respectively providing interferograms; and
    reconstructing respective planes of the three optical elements by an iterative processing operation in which the actual measurements are mathematically simulated and simulated measurements are compared with the actual measurements;
    wherein each actual measurement is carried out by placing the respective surfaces of two of the three optical elements facing each other, respectively in a reference surface position and in a test surface position, and
    wherein at least one of the actual measurements is made after having performed a rotation around the measurement axis, and another actual measurement is made after having performed a translation perpendicular to the measurement axis of one of the two optical elements relative to the other.

2. The method according to claim 1, wherein the interferometer is an interferometer of Fizeau type.

3. The method according to claim 1, wherein at least two rotations are performed around the measurement axis and respective angles of both rotations differ from each other by more than 10°.

4. The method according to claim 1, wherein each rotation is performed according to an angle which is not a sub-multiple of 360°.

5. The method according to claim 1, wherein a translation shift is determined in a plane perpendicular to the measurement axis and a rotational shift is determined around the measurement axis.

6. The method according to claim 5, wherein a zoom shift is further determined in the plane perpendicular to the measurement axis.

7. The method according to claim 5, wherein interferograms of both actual measurements are divided into plural portions, correlation products between corresponding portions are calculated, respective positions of correlation peaks corresponding to the correlation products are determined, and each shift is determined from the determined respective positions.

8. The method according to claim 7, wherein each interferogram is divided into nine portions that form a 3×3 matrix.

9. The method according to claim 7, wherein gradients of the portions are determined and the correlation products between corresponding gradients are calculated.

10. The method according to claim 7, wherein a position of each correlation peak is determined by a barycentric calculation.

* * * * *